US009160917B2

United States Patent
Lin et al.

(10) Patent No.: US 9,160,917 B2
(45) Date of Patent: Oct. 13, 2015

(54) HANDHELD ELECTRONIC APPARATUS AND IMAGE CAPTURING APPARATUS AND FOCUSING METHOD THEREOF

(71) Applicant: HTC Corporation, Taoyuan County (TW)

(72) Inventors: Ming-Tien Lin, Taoyuan County (TW); Chun-Ta Lin, Taoyuan County (TW); Chih-Jen Hu, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 48 days.

(21) Appl. No.: 13/937,223

(22) Filed: Jul. 9, 2013

(65) Prior Publication Data

US 2015/0015769 A1    Jan. 15, 2015

(51) Int. Cl.
*H04N 5/232* (2006.01)
*H04N 5/247* (2006.01)

(52) U.S. Cl.
CPC .......... *H04N 5/23212* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 5,786,847 A | 7/1998 | Katayama et al. | |
| 7,777,781 B2 | 8/2010 | Helbing et al. | |
| 8,013,895 B2 | 9/2011 | Helbing et al. | |
| 8,169,489 B2 | 5/2012 | Orimoto et al. | |
| 8,184,165 B2 | 5/2012 | Baek et al. | |
| 8,189,100 B2 | 5/2012 | Li et al. | |
| 8,363,091 B2 | 1/2013 | Hoshino | |
| 2003/0160886 A1* | 8/2003 | Misawa et al. | 348/347 |
| 2008/0218611 A1 | 9/2008 | Parulski et al. | |
| 2008/0219654 A1* | 9/2008 | Border et al. | 396/89 |
| 2008/0304819 A1 | 12/2008 | Tolbert | |
| 2009/0051776 A1 | 2/2009 | Wernersson | |
| 2009/0167927 A1 | 7/2009 | Kusaka | |
| 2013/0033572 A1 | 2/2013 | Wernersson | |
| 2013/0038757 A1* | 2/2013 | Haneda et al. | 348/231.99 |
| 2013/0053101 A1* | 2/2013 | Tsai et al. | 455/556.1 |

FOREIGN PATENT DOCUMENTS

| | | |
|---|---|---|
| CA | 2746159 | 1/2012 |
| EP | 2390706 | 11/2011 |

OTHER PUBLICATIONS

"Office Action of Taiwan Counterpart Application", issued on Aug. 19, 2014, p. 1-p. 8, in which the listed reference was cited.

* cited by examiner

*Primary Examiner* — Albert Cutler
(74) *Attorney, Agent, or Firm* — McClure, Qualey & Rodack, LLP

(57) ABSTRACT

A handheld electronic apparatus, an image capturing apparatus and focusing method thereof are provided. The image capturing apparatus includes a main image capturer, an auxiliary image capturer and a controller. The main image capturer performs an image capturing operation on a target object according to a detection focusing distance. The auxiliary image capturer is disposed adjacent to the main image capturer. The auxiliary image capturer performs a plurality of focusing operations on the target object according to a plurality of focusing distances, and generates a plurality of image contrast values. The controller controls the main image capturer and the auxiliary image capturer. The controller selects one of the focusing distances to be the detection focusing distance according to the image contrast values.

20 Claims, 5 Drawing Sheets

HANDHELD ELECTRONIC APPARATUS AND IMAGE CAPTURING APPARATUS AND FOCUSING METHOD THEREOF

BACKGROUND OF THE INVENTION

1. Field of the Invention

The invention relates to an image capturing apparatus, and more particularly to an image capturing apparatus of a handheld electronic apparatus.

2. Description of Related Art

With advancement of electronic technologies, handheld electronic apparatuses have become an important tool in daily lives. A handheld electronic apparatus is usually disposed with an image capturing apparatus which is now a standard equipment for the handheld electronic apparatus.

Take a cell phone as an example, during an auto-focusing operation in conventional art, the image capturing apparatus (e.g., a camera) can scan an image by using an image sensor (e.g., a CMOS sensor) with movements of an actuator equipped therein, and record a contrast value of the image. The camera performs a focusing operation and performs an image capturing operation by selecting a proper moving distance for the actuator according to the contrast value of the image.

With increasingly higher image resolution of the camera, a frame per second (fps) supported by a high-resolution camera cannot be significantly increased due to a restriction of a size of data transmission channels, thus an auto-focusing time taken by the camera cannot be shorten. As a result, a time taken for the camera to perform the image capturing operation cannot be shorten, which leads to inconveniences in use.

SUMMARY OF THE INVENTION

The invention provides an image capturing apparatus capable of performing rapid auto focusing on a target object and performing an image capturing operation.

The invention provides a handheld electronic apparatus having an image capturing apparatus capable of performing rapid auto focusing on a target object and performing an image capturing operation.

The invention further provides focusing method of image capturing apparatus, capable of performing rapid auto focusing on a target object and performing an image capturing operation.

The image capturing apparatus of the invention includes a main image capturer, an auxiliary image capturer and a controller. The main image capturer performs an image capturing operation on a target object according to a detection focusing distance. The auxiliary image capturer is disposed adjacent to the main image capturer, and the auxiliary image capturer performs a plurality of focusing operations on the target object according to a plurality of focusing distances, and generates a plurality of image contrast values. The controller is coupled to the main image capturer and the auxiliary image capturer to control the main image capturer and the auxiliary image capturer. The controller selects one of the focusing distances to be the detection focusing distance according to the image contrast values.

In an embodiment of the invention, the controller selects a highest value among the image contrast values, and selects the focusing distance corresponding to the highest value among the image contrast values to be the detection focusing distance.

In an embodiment of the invention, the controller drives the auxiliary image capturer to perform the focusing operations on the target object according to the focusing distances being sequentially varied so as to generate the image contrast values. The controller selects one of the focusing distances to be the detection focusing distance according to a variation trend of the image contrast values.

In an embodiment of the invention, the image capturing apparatus further includes a lookup table. The lookup table is coupled to the controller, wherein the controller generates a main focusing distance from the detection focusing distance according to the lookup table, and the main image capturer focuses on the target object according to the main focusing distance and performs the image capturing operation.

In an embodiment of the invention, a speed for performing the focusing operations by the auxiliary image capturer is at least 8 times a speed for performing the focusing operation by the main image capturer.

In an embodiment of the invention, the main image capturer includes a main image sensing chip, and the auxiliary image capturer includes an auxiliary image sensing chip. A size of the main image sensing chip is greater than a size of the auxiliary image sensing chip.

In an embodiment of the invention, a view range of the auxiliary image capturer covers a view range of the main image capturer.

In an embodiment of the invention, the main image capturer includes a main actuator, and the auxiliary image capturer includes an auxiliary actuator. The main actuator and the auxiliary actuator are coupled to the controller and configured to make the main image capturer and the auxiliary image capturer to perform the focusing operations.

The handheld electronic apparatus of the invention includes an image capturing apparatus. The image capturing apparatus includes a main image capturer, an auxiliary image capturer and a controller. The main image capturer performs an image capturing operation on a target object according to a detection focusing distance. The auxiliary image capturer is disposed adjacent to the main image capturer, and the auxiliary image capturer performs a plurality of focusing operations on the target object according to a plurality of focusing distances, and generates a plurality of image contrast values. The controller is coupled to the main image capturer and the auxiliary image capturer to control the main image capturer and the auxiliary image capturer. The controller selects one of the focusing distances to be the detection focusing distance according to the image contrast values.

The focusing method of image capturing apparatus of the invention includes: providing an auxiliary image capturer to perform a plurality of focusing operations on a target object according to a plurality of focusing distances, and to generate a plurality of image contrast values; selecting one of the focusing distances to be the detection focusing distance according to the image contrast values; and providing a main image capturer to perform an image capturing operation on the target object according to the detection focusing distance.

In summary, the image capturing apparatus of the invention first performs the focusing operations on the target object by using the auxiliary image capturer with rapid focusing speed. Next, the detection focusing distance generated from performing the focusing operations on the target object by using the auxiliary image capturer is provided to the main image capturer. The main image capturer can perform the focusing operations on the target object according to the detection focusing distance, and perform the image capturing operation on the target object. Accordingly, when the image capturing operation is performed on the target object, the image capturing apparatus can save a focusing time for the image capturing operation without sacrificing the image resolution.

To make the above features and advantages of the disclosure more comprehensible, several embodiments accompanied with drawings are described in detail as follows.

DESCRIPTION OF THE EMBODIMENTS

Figure 1:
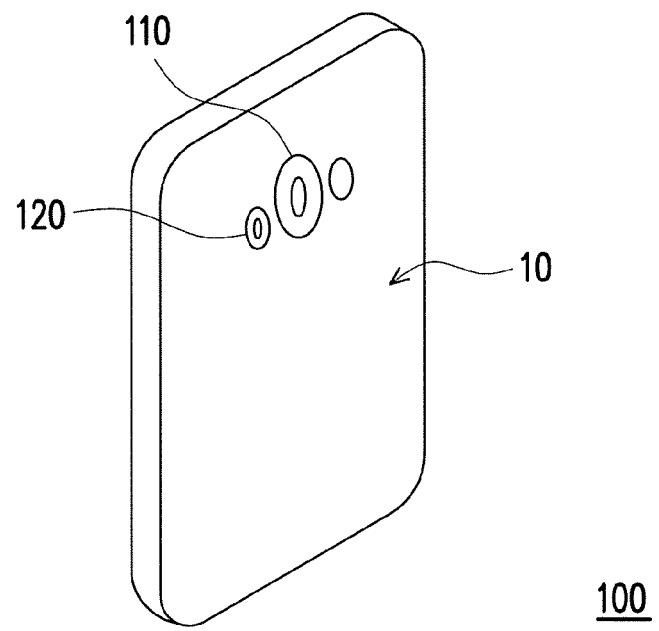
FIG. 1 is a schematic view illustrating a handheld electronic apparatus 100 according to an embodiment of the invention.

Referring to FIG. 1, FIG. 1 is a schematic view illustrating a handheld electronic apparatus 100 according to an embodiment of the invention. In the handheld electronic apparatus 100, the image capturing apparatus includes a main image capturer 110 and an auxiliary image capturer 120. The main image capturer 110 and the auxiliary image capturer 120 are disposed on the same plane of a substrate 10 of the handheld electronic apparatus 100. In addition, the auxiliary image capturer 110 and the main image capturer 120 are disposed adjacent to each other. In the present embodiment, the main image capturer 110 focuses on a target object according to a detection focusing distance and performs an image capturing operation. The detection focusing distance is generated by the auxiliary image capturer 120. More specifically, when the handheld electronic apparatus 110 performs a shooting (image capturing) operation on the target object, first, the auxiliary image capturer 120 performs a plurality of focusing operations on the target object according to a plurality of focusing distances. A plurality of image contrast values are generated by performing rapid image capturing operation on the target object under different focusing distances. The image contrast values are respectively corresponding to the focusing distances used in the focusing operations performed by the auxiliary image capturer 120. By analyzing the image contrast values, the image capturing apparatus of the handheld electronic apparatus 100 can select a highest value among the image contrast values, and select the focusing distance corresponding to the highest one among the image contrast value to be the detection focusing distance.

Accordingly, the main image capturer 110 can directly move a lens according to the detection focusing distance, and perform the image capturing operation on the target object. In other words, the main image capturer 110 can perform the focusing operations without repeatedly moving the lens for finding an optimal focusing distance, such that a time taken by the main image capturer 110 for performing the focusing operation can be saved.

It should be noted that, the main image capturer 110 as disposed in the present embodiment is a high-resolution image capturer, whereas the auxiliary image capturer 120 is a low-resolution image capturer. In other word, a speed for obtaining the image contrast values corresponding the focusing distances by using the auxiliary image capturer 120, is a lot faster than a speed for obtaining the same by using the main image capturer 110. In the present embodiment, a speed for performing the focusing operations by the auxiliary image capturer 120 is at least 8 times a speed for performing the focusing operation by the main image capturer 110.

Figure 2:
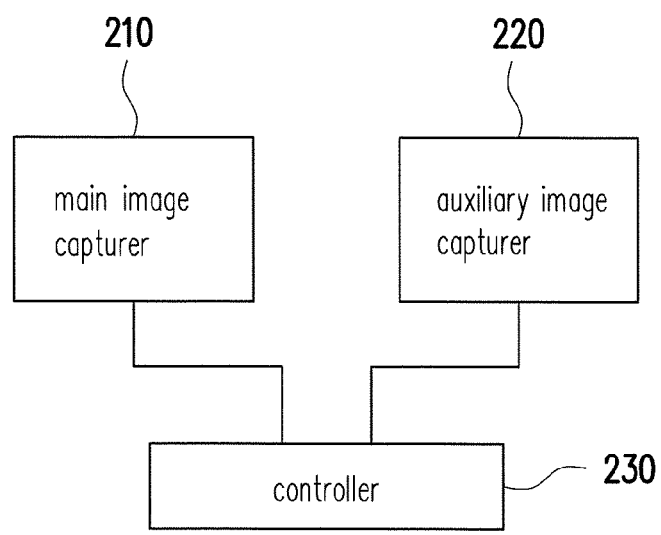
FIG. 2 is a schematic view illustrating an image capturing apparatus 200 according to an embodiment of the invention.

Referring to FIG. 2, FIG. 2 is a schematic view illustrating an image capturing apparatus 200 according to an embodiment of the invention. The image capturing apparatus 200 includes a main image capturer 210, an auxiliary image capturer 220 and a controller 230. The auxiliary image capturer 210 and the main image capturer 220 are coupled to the controller 230. When the image capturing apparatus 200 performs an image capturing operation, first, the auxiliary image capturer 220, under control of the controller 230, sequentially performs a plurality of focusing operations on a target object respectively according to a plurality of focusing distances. The focusing distances can be sequentially ascending, or sequentially descending, based on an order of the focusing operations. Further, the auxiliary image capturer 220 performs the image capturing operation on the target object under different focusing distances, and a captured image is then transferred to the controller 230 for analyzing. The controller 230 analyzes the image contrast values from received images, and finds a highest value among the image contrast values. The controller 230 selects the focusing distance corresponding to the highest value among the image contrast values, such that a detection focusing distance is obtained.

On a basis that the disposing positions of the main image capturer 210 and the auxiliary image capturer 220 are sure to be different from one another, the controller 230 performs a conversion according to the detection focusing distance, and generates a main focusing distance accordingly. The main focusing distance can be directly provided for the main image capturer 210 to perform the focusing operations. Therein, the controller 230 can perform the conversion of the detection focusing distance and the main focusing distance by utilizing a relation between a distance from the main image capturer 210 to the target object and a distance from the auxiliary image capturer 220 to the target object. Above-mentioned relation between the distances can be obtained by a designer by performing practical measurements to the image capturing apparatus 200. Data content of the relation can be implemented into a lookup table and recorded in a memory.

In addition, the main image capturer 210 can include a main image sensing chip, and the auxiliary image capturer 220 can include an auxiliary image sensing chip. A size of the main image sensing chip 210 is greater than a size of the auxiliary image sensing chip 220.

Figure 3A:
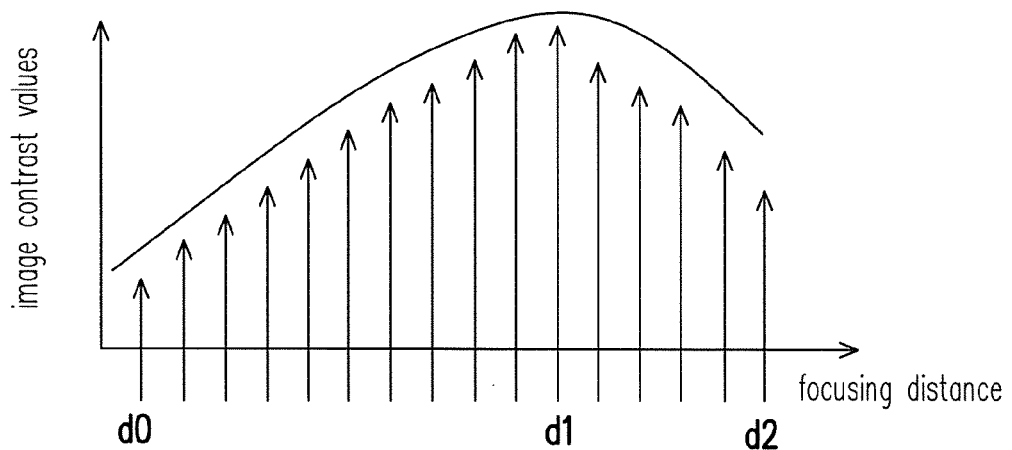
FIG. 3A is a schematic view illustrating an implementation of the detection focusing distance according to an embodiment of the invention.
Figure 3B:
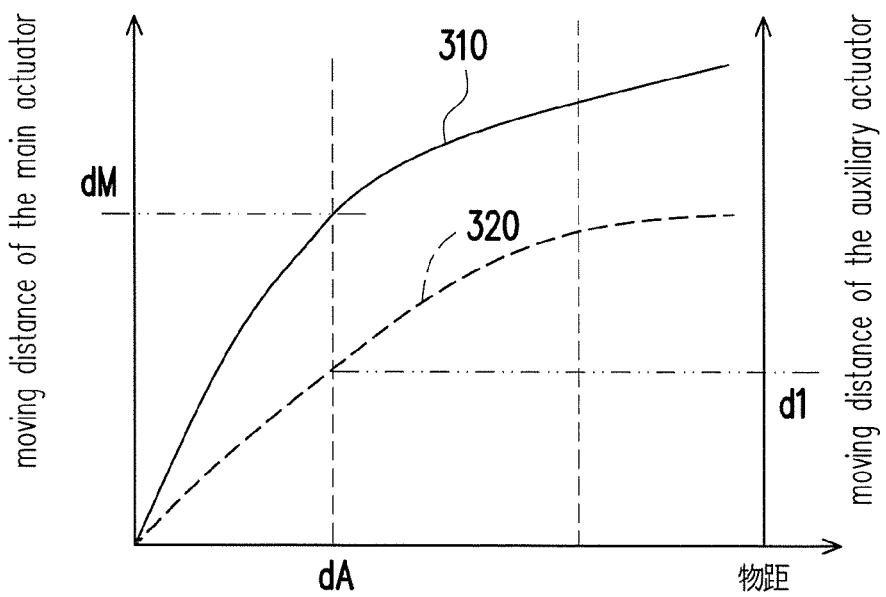
FIG. 3B is a schematic view illustrating an implementation of a conversion between the detection focusing distance and the main focusing distance.

Referring to FIG. 2, FIG. 3A and FIG. 3B, FIG. 3A is a schematic view illustrating an implementation of the detection focusing distance according to an embodiment of the invention, and FIG. 3B is a schematic view illustrating an implementation of a conversion between the detection focusing distance and the main focusing distance. In FIG. 3A, the auxiliary image capturer 220 performs an image capturing operation on the target object according to a plurality of ascending focusing distances d0~d1~d2, so as to obtain a plurality of image contrast values. Further, in correspondence to the focusing distances d0~d1, the image contrast values is ascending as the focusing distance increases; and in correspondence to the focusing distances d1~d2, the image contrast values is descending as the focusing distance increases. In other words, since the image contrast value corresponding to the focusing distance d1 is of the highest value, thus the controller 230 can select the focusing distance d1 to be the detection focusing distance.

In view of FIG. 3A, it can be known that the auxiliary image capturer 230 does not need to perform the focusing operations and the image capturing operation for all of the focusing distances d0~d2. While the focusing operations and the image capturing operation are performed by the auxiliary image capturer 220, the controller 230 can determine a variation trend with respect to rising and falling of the image contrast values. When the variation trend of the image contrast values is changed from rising to falling, the controller 230 can then select the focusing distance corresponding to the highest one among the image contrast values.

In addition, in FIG. 3B, curves 310 and 320 represent a relation diagram between moving distances of an auxiliary actuator and a main actuator under different object distances. Therein, the auxiliary image capturer 220 performs the focusing operations through a movement of the auxiliary actuator, and the main image capturer 210 performs the focusing operation through a movement of the main actuator. In view of FIG. 3B, it can be known that in case the object distance is equal to a distance dA, when the auxiliary actuator moves for a focusing distance d1 equal to the detection focusing distance, the main focusing distance of the main actuator corresponding being moved is a focusing distance dM.

Figure 4:
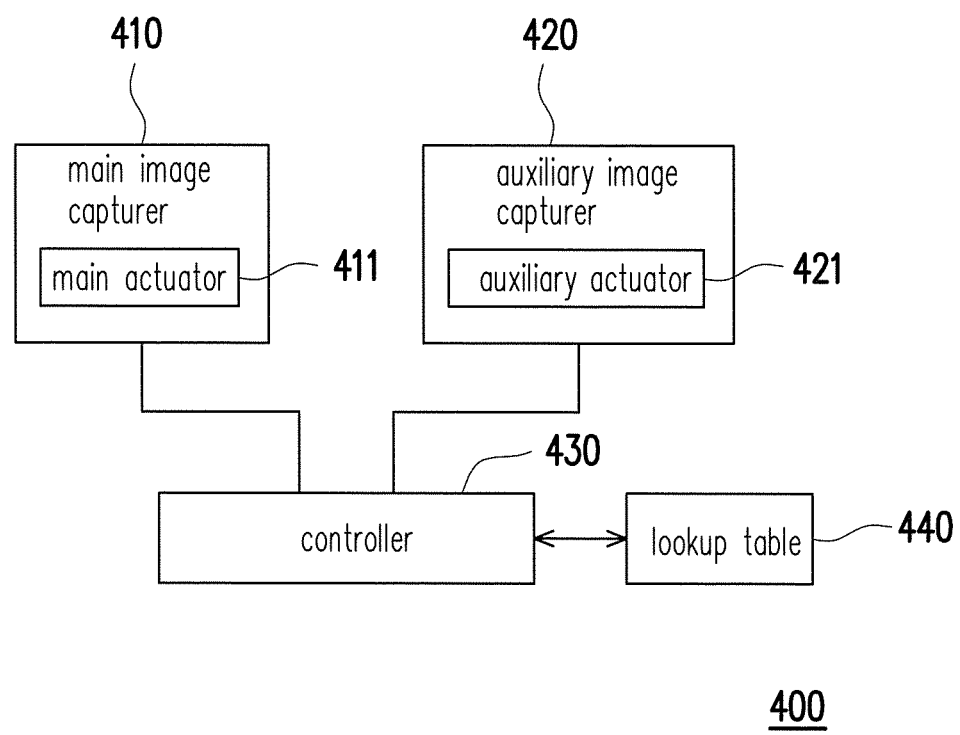
FIG. 4 is a schematic view illustrating an image capturing apparatus 400 according to another embodiment of the invention.

Referring to FIG. 4, FIG. 4 is a schematic view illustrating an image capturing apparatus 400 according to another embodiment of the invention. The image capturing apparatus 400 includes a main image capturer 410, an auxiliary image capturer 430, a controller 440 and a lookup table 440. The main image capturer 410 includes a main actuator 411, and the auxiliary image capturer 420 includes an auxiliary actuator 412. The main actuator 411 and the auxiliary actuator 412 are coupled to the controller 430 and moved according to the commands transferred by the controller 430, so as to make the main image capturer 410 and the auxiliary image capturer 420 to perform the focusing operations. The lookup table 440 is coupled to the controller 430, and the lookup table 440 can record information of a relation between the curves 310 and 320, as depicted in FIG. 3B.

In the present embodiment, the main actuator 411 and the auxiliary actuator 412 can be a voice coil motor (VCM), a stepping motor or motors in various types. The voice coil motor is an apparatus capable of converting an electrical energy into a mechanical energy while realizing a linear movement and a movement with limited swing angle. The voice coil motor generates a regular movement by utilizing a mutual effect of magnetic poles between a magnetic field from a permanent magnet steel and a magnetic field generated by conducting coil conductors. Since the voice coil motor is a non-commutated power apparatus, a positioning accuracy thereof is fully depended on a control system of the voice coil motor. The stepping motor is a motor having stators and rotors which are projected as wheels jointing each other, and gradually rotating in a specific angle by switching a current flowed into a stator coil. The stepping motor can switch triggering operations of the current through a pulse signal without performing a detecting operations on positions and speeds of the rotors. Thus, the stepping motor can rotate accurately and proportionally according to the pulse signal being received, so as to accurately control a position and a speed thereof, thereby providing a more preferable stability.

For an implementation of the lookup table 440, the lookup table 440 can be constructed by using a non-volatile memory module, so that the relation of the curves 310 and 320 depicted in FIG. 3B can be digitalized so digitalized values can then be written into the lookup table 440.

Besides being disposed outside the controller 430 as to be coupled to the controller 430, the lookup table 440 can also be embedded in the controller 430. In summary, a location of the lookup table 440 is not particularly limited.

Figure 5A:
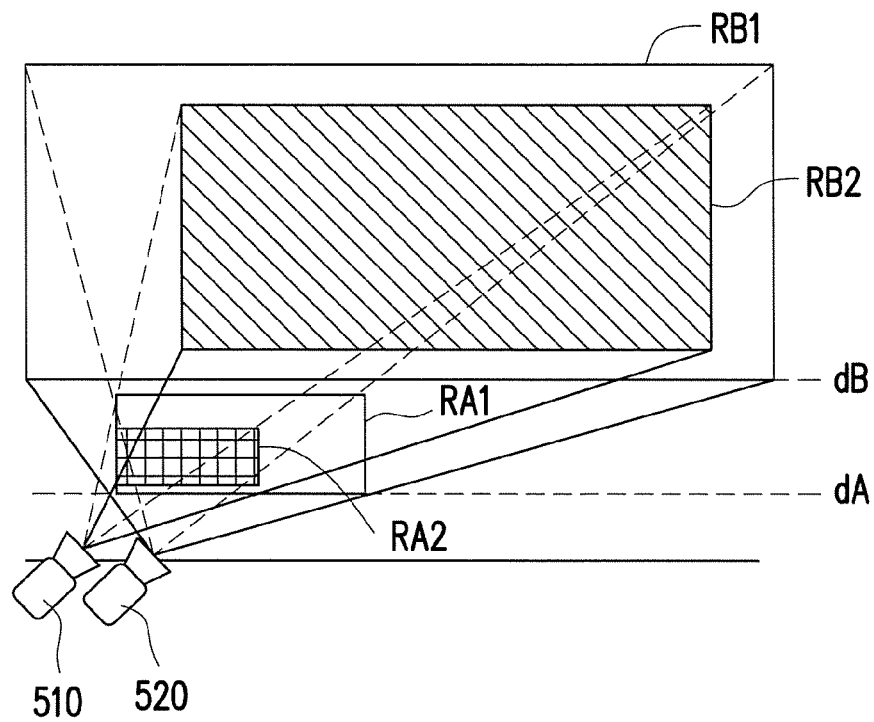
FIG. 5A and FIG. 5B are schematic views illustrating a coverage status of view ranges of the image capturing apparatus according to an embodiment of the invention.
Figure 5B:
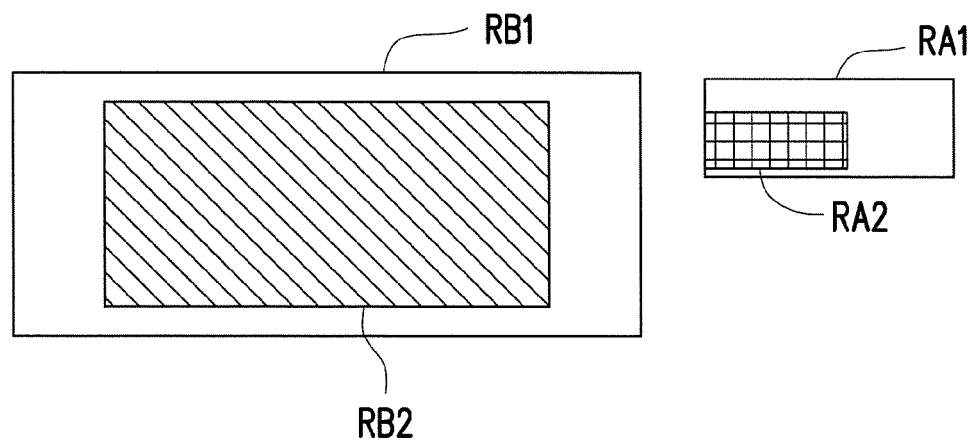

Referring to FIG. 5A and FIG. 5B, FIG. 5A and FIG. 5B are schematic views illustrating a coverage status of view ranges of the image capturing apparatus according to an embodiment of the invention. In FIG. 5A, view ranges of a main image capturer 510 and an auxiliary image capturer 520 at an object distance dA are RA1 and RA2, respectively; and view ranges of the main image capturer 510 and the auxiliary image capturer 520 at an object distance dB are RB1 and RB2, respectively. It can be clearly found in FIG. 5B that, the view ranges RB1 and RB2 of the auxiliary image capturer 520 respectively cover the view ranges RA1 and RA2 of the auxiliary image capturer 510. Of course, in other embodiments of the invention, the view range of the auxiliary image capturer 520 can also be slightly smaller than the view range of the main image capturer 510.

Figure 6:
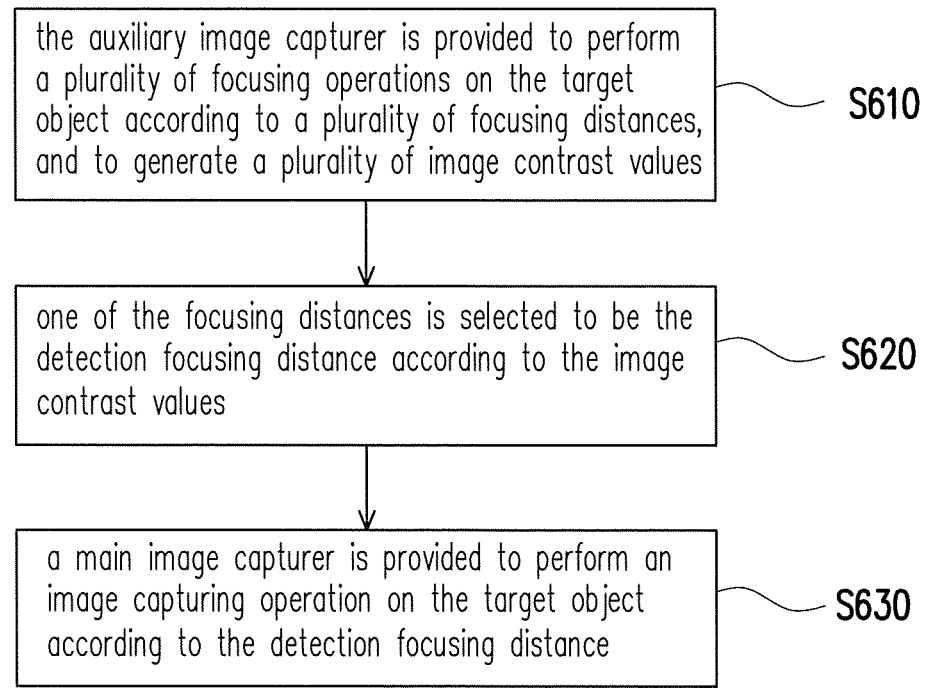
FIG. 6 is a flowchart illustrating a focusing method of the image capturing apparatus according to an embodiment of the invention.

Referring to FIG. 6, FIG. 6 is a flowchart illustrating a focusing method of the image capturing apparatus according to an embodiment of the invention. In step S610, the auxiliary image capturer is provided to perform a plurality of focusing operations on the target object according to a plurality of focusing distances, and to generate a plurality of image contrast values. Next, in step S620, one of the focusing distances is selected to be the detection focusing distance according to the image contrast values. Next, in step S630, a main image capturer is provided to perform an image capturing operation on the target object according to the detection focusing distance.

In addition, for assigning a portion on the target object, a user can select the target object to the focused by using a touching method on a display frame displayed on the screen of the handheld electronic apparatus. Or, the handheld electronic apparatus can recognize a face portion of a person within the view range by using a facial recognition technology, so as to perform the focusing operation on the face portion of the person which is served as the target object. Of course, the handheld electronic apparatus can also select the target object suitable for the embodiments of the invention by using other methods.

Relevant implementation detail for the steps above has been described in the previous embodiments and implementations, thus it is omitted hereinafter.

In view of above, the invention can perform rapid focusing operations on the target object by using the auxiliary image capturer, and the detection focusing distance can be calculated accordingly. The main image capturer can perform the focusing operations on the target object according to the detection focusing distance, and perform the image capturing operation. Accordingly, the speed for performing the focusing operations on the target object by the image capturing apparatus is not reduced due the high-resolution of the main image capturer. In other words, the auxiliary image capturer of the invention can significantly improve performance in image capturing operation while effectively providing preferable image resolution and preferable speed for image capturing operation.

What is claimed is:

1. An image capturing apparatus, comprising:
   a main image capturer performing an image capturing operation on a target object according to a detection focusing distance;

an auxiliary image capturer disposed adjacent to the main image capturer, and the auxiliary image capturer performing a plurality of focusing operations on the target object according to a plurality of focusing distances, and generating a plurality of image contrast values;

a controller coupled to the main image capturer and the auxiliary image capturer to control the main image capturer and the auxiliary image capturer, and the controller selecting one of the focusing distances to be the detection focusing distance according to the image contrast values;

a touch screen configured to receive input corresponding to the target object; and a lookup table coupled to the controller, wherein the controller generates a main focusing distance from the detection focusing distance after all of the focusing operations are completed according to the lookup table, and the main image capturer focuses on the target object according to the main focusing distance and performs the image capturing operation, and the detection focusing distance is smaller than the main focusing distance, wherein the image capturing apparatus is a handheld device, and wherein a view range of the main image capturer is smaller than a view range of the auxiliary image capturer.

2. The image capturing apparatus of claim 1, wherein the controller selects a highest value among the image contrast values, and selects the focusing distance corresponding to the highest value among the image contrast values to be the detection focusing distance.

3. The image capturing apparatus of claim 1, wherein the controller drives the auxiliary image capturer to perform the focusing operations on the target object according to the focusing distances being sequentially varied for generating the image contrast values, and the controller selects one of the focusing distances to be the detection focusing distance according to a variation trend of the image contrast values.

4. The image capturing apparatus of claim 1, wherein a speed for performing the focusing operations by the auxiliary image capturer is at least 8 times a speed for performing the focusing operations by the main image capturer, and an image resolution of the main image capturer is higher than an image resolution of the auxiliary image capturer.

5. The image capturing apparatus of claim 1, wherein the main image capturer comprises a main image sensing chip, the auxiliary image capturer comprises an auxiliary image sensing chip, and a size of the main image sensing chip is greater than a size of the auxiliary image sensing chip.

6. The image capturing apparatus of claim 1, wherein the view range of the auxiliary image capturer covers the view range of the main image capturer.

7. The image capturing apparatus of claim 1, wherein the main image capturer comprises a main actuator, the auxiliary image capturer comprises an auxiliary actuator, the main actuator and the auxiliary actuator are coupled to the controller and configured to make the main image capturer and the auxiliary image capturer to respectively perform the focusing operations.

8. An electronic apparatus, comprising:
an image capturing apparatus, comprising:
a main image capturer performing an image capturing operation on a target object according to a detection focusing distance;
an auxiliary image capturer disposed adjacent to the main image capturer, and the auxiliary image capturer performing a plurality of focusing operations on the target object according to a plurality of focusing distances, and generating a plurality of image contrast values;

a controller coupled to the main image capturer and the auxiliary image capturer to drive the main image capturer and the auxiliary image capturer, and the controller selecting one of the focusing distances to be the detection focusing distance according to the image contrast values;

a touch screen configured to receive input corresponding to the target object; and a lookup table coupled to the controller, wherein the controller generates a main focusing distance from the detection focusing distance after all of the focusing operations are completed according to the lookup table, and the main image capturer focuses on the target object according to the main focusing distance and performs the image capturing operation, and the main focusing distance is larger than the detection focusing distance, wherein the image capturing apparatus is a handheld device, and wherein a view range of the main image capturer is smaller than a view range of the auxiliary image capturer.

9. The handheld electronic apparatus of claim 8, wherein the controller selects a highest value among the image contrast values, and selects the focusing distance corresponding to the highest value among the image contrast values to be the detection focusing distance.

10. The handheld electronic apparatus of claim 8, wherein the controller drives the auxiliary image capturer to perform the focusing operations on the target object according to the focusing distances being sequentially varied so as to generate the image contrast values, and the controller selects one of the focusing distances to be the detection focusing distance according to a variation trend of the image contrast values.

11. The handheld electronic apparatus of claim 8, wherein a speed for performing the focusing operations by the auxiliary image capturer is at least 8 times a speed for performing the focusing operations by the main image capturer, and an image resolution of the main image capturer is higher than an image resolution of the auxiliary image capturer.

12. The handheld electronic apparatus of claim 8, wherein the main image capturer comprises a main image sensing chip, the auxiliary image capturer comprises an auxiliary image sensing chip, and a size of the main image sensing chip is greater than a size of the auxiliary image sensing chip.

13. The handheld electronic apparatus of claim 8, wherein the view range of the auxiliary image capturer covers the view range of the main image capturer.

14. The handheld electronic apparatus of claim 8, wherein the main image capturer comprises a main actuator, the auxiliary image capturer comprises an auxiliary actuator, the main actuator and the auxiliary actuator are coupled to the controller and configured to make the main image capturer and the auxiliary image capturer to respectively perform the focusing operations.

15. A focusing method of image capturing apparatus, comprising:
providing an auxiliary image capturer to perform a plurality of focusing operations on a target object according to a plurality of focusing distances, and to generate a plurality of image contrast values;

selecting one of the focusing distances to be the detection focusing distance according to the image contrast values;

providing a main image capturer to perform an image capturing operation on the target object according to the detection focusing distance; and providing a touch screen configured to receive input corresponding to the target object, wherein a main focusing distance is generated according to the detection focusing distance after all of the focusing operations are completed according to a lookup table, and the main image capturer focuses on the target object according to the main focusing distance and performs the image capturing operation, and the detection focusing distance is smaller than the main focusing distance, wherein the image capturing apparatus is a handheld device, and wherein a view range of the main image capturer is smaller than a view range of the auxiliary image capturer.

16. The focusing method of image capturing apparatus of claim 15, wherein selecting one of the focusing distances to be the detection focusing distance according to the image contrast values, comprising:

selecting a highest value among the image contrast values, and selecting the focusing distance corresponding to the highest value among the image contrast values to be the detection focusing distance.

17. The focusing method of image capturing apparatus of claim 15, wherein providing the auxiliary image capturer performing the focusing operations on the target object according to the focusing distances, and generating the image contrast values, comprising:

performing the focusing operations on the target object according to the focusing distances being sequentially varied so as to generate the image contrast values.

18. The focusing method of image capturing apparatus of claim 17, wherein selecting one of the focusing distances to be the detection focusing distance according to the image contrast values, comprising:

selecting one of the focusing distances to be the detection focusing distance according to a variation trend of the image contrast values.

19. The focusing method of image capturing apparatus of claim 15, wherein a speed for performing the focusing operations by the auxiliary image capturer is at least 8 times a speed for performing the focusing operations by the main image capturer, and an image resolution of the main image capturer is higher than an image resolution of the auxiliary image capturer.

20. The focusing method of image capturing apparatus of claim 15, wherein the view range of the auxiliary image capturer covers the view range of the main image capturer.

* * * * *